(12) United States Patent
Shige et al.

(10) Patent No.: US 8,424,401 B2
(45) Date of Patent: Apr. 23, 2013

(54) BALL SCREW UNIT

(75) Inventors: Yoshifumi Shige, Kashiba (JP); Satoshi Kondo, Okazaki (JP); Yasuhiro Ohta, Kitanagoya (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 0 days.

(21) Appl. No.: 13/364,203

(22) Filed: Feb. 1, 2012

(65) Prior Publication Data

US 2012/0125134 A1 May 24, 2012

Related U.S. Application Data

(63) Continuation of application No. 12/320,016, filed on Jan. 14, 2009, now Pat. No. 8,230,749.

(30) Foreign Application Priority Data

Jan. 15, 2008 (JP) .................................. 2008-005504

(51) Int. Cl.
*F16H 29/02* (2006.01)
(52) U.S. Cl.
USPC ........................................................ 74/89.34
(58) Field of Classification Search ................. 74/89.23, 74/89.34, 89.36, 89.37, 89.29, 89.35; 384/510, 384/535, 537, 517
See application file for complete search history.

(56) References Cited

U.S. PATENT DOCUMENTS

| | | | | |
|---|---|---|---|---|
| 2,982,145 A | | 5/1961 | Orner | |
| 3,659,683 A | * | 5/1972 | Betzing | 188/162 |
| 3,730,015 A | * | 5/1973 | Cornell | 74/89.37 |
| 4,485,728 A | * | 12/1984 | Bando | 92/178 |
| 4,589,531 A | * | 5/1986 | Washbourn | 477/22 |
| 4,596,179 A | * | 6/1986 | Bando | 92/178 |
| 5,111,708 A | * | 5/1992 | Brusasco | 74/89.23 |
| 5,799,543 A | * | 9/1998 | Nagai et al. | 74/490.09 |
| 5,831,360 A | * | 11/1998 | Senjo et al. | 310/80 |
| 5,868,032 A | * | 2/1999 | Laskey | 74/89.37 |
| 7,159,482 B2 * | | 1/2007 | Nagai et al. | 74/89.25 |
| 7,562,594 B2 * | | 7/2009 | Nagai et al. | 74/89.23 |
| 2003/0006119 A1 * | | 1/2003 | Harvey | 192/141 |
| 2003/0167864 A1 * | | 9/2003 | Biester et al. | 74/89.23 |
| 2004/0182638 A1 | | 9/2004 | Tatewaki et al. | |
| 2005/0252318 A1 * | | 11/2005 | Corney | 74/89.23 |
| 2005/0268736 A1 * | | 12/2005 | Gaechter | 74/89.23 |

(Continued)

FOREIGN PATENT DOCUMENTS

| | | |
|---|---|---|
| DE | 3502774 A1 | 10/1986 |
| JP | 2005-264992 | 9/2005 |

OTHER PUBLICATIONS

Extended European Search Report dated Dec. 17, 2009.

*Primary Examiner* — Justin Krause
*Assistant Examiner* — Keith Minter
(74) *Attorney, Agent, or Firm* — McGinn IP Law Group, PLLC

(57) ABSTRACT

A ball screw unit includes a screw shaft that includes a screw groove, a ball screw nut that is screwed to the screw shaft via balls and that rotates to move the screw shaft linearly in an axial direction of the screw shaft, a hollow shaft that rotates together with the ball screw nut, a housing that rotatably supports the hollow shaft via a rolling bearing, and an elastic member that is provided at a position between the rolling bearing and the housing.

14 Claims, 1 Drawing Sheet

U.S. PATENT DOCUMENTS

2008/0092679 A1* 4/2008 Tateishi et al. ............... 74/89.23
2009/0165581 A1* 7/2009 Koyagi et al. ................ 74/89.23
2010/0000354 A1* 1/2010 Shige et al. .................. 74/89.23
2010/0108742 A1* 5/2010 Stol et al. ....................... 228/2.1
2011/0061482 A1* 3/2011 Maruyama et al. .......... 74/89.23

* cited by examiner

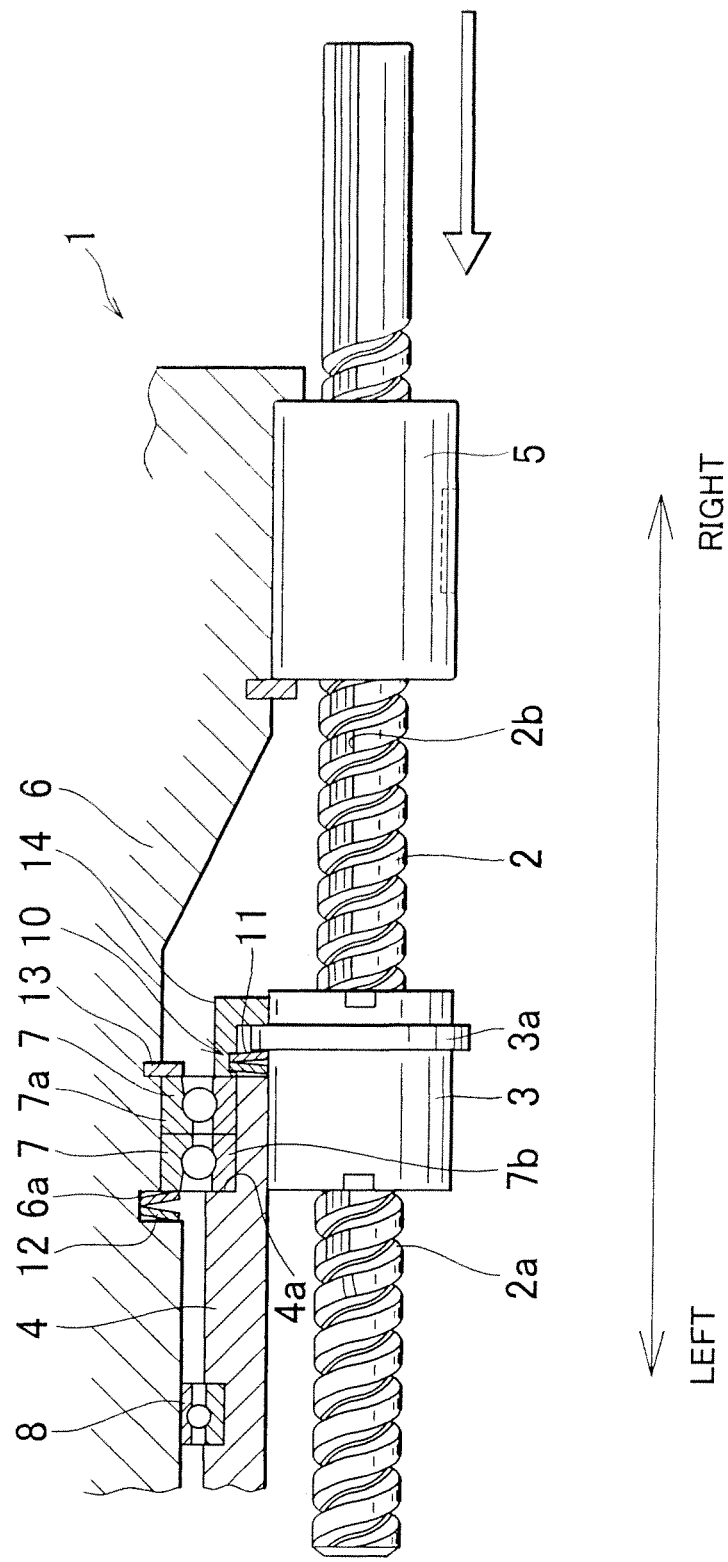

BALL SCREW UNIT

INCORPORATION BY REFERENCE

The present Application is a Continuation Application of U.S. patent application Ser. No. 12/320,016, filed on Jan. 14, 2009, now U.S. Pat. No. 8,230,749, the disclosure of which is incorporated herein by reference.

The present application claims priority from Japanese Patent Application No. 20084-05504 filed on Jan. 15, 2008. The disclosure of Japanese Patent Application No. 2008-005504 filed on Jan. 15, 2008 including the specification, drawings and abstract is incorporated herein by reference in its entirety.

BACKGROUND OF THE INVENTION

1. Field of the Invention

The invention relates generally to a ball screw unit, and more specifically to a ball screw unit in which a screw shaft does not rotate but moves linearly in its axial direction.

2. Description of the Related Art

A ball screw unit that includes a screw shaft and a ball screw nut that is screwed onto the screw shaft via balls is commonly used for an electric actuator or a shock absorber. For example, Japanese Patent Application Publication No. 2005-264992 (JP-A-2005-264992) describes that a ball screw unit, which has a ball screw nut that is connected to a motor and a screw shaft that moves linearly, is applied to a shock absorber.

A shock absorber is usually provided with a stopper so that a screw shaft is prevented from moving by an amount equal to or larger than a predetermined amount when a large external force is applied. Immediately before the screw shaft is stopped by the stopper, the screw shaft is moving at a high speed and a ball screw nut is rotating at a high speed. Therefore, a large rotational inertia force may be generated at the ball screw nut due to a sudden stop of the screw shaft, and an indentation may be formed in a path portion of a ball screw.

SUMMARY OF THE INVENTION

The invention provides a ball screw unit that is suitable for the use in the state where a screw shaft does not rotate but moves linearly in its axial direction.

An aspect of the invention relates to a ball screw unit which includes: a screw shaft that has a screw groove; a ball screw nut that is screwed to the screw shaft via balls and that rotates to move the screw shaft linearly in the axial direction of the screw shaft: a hollow shaft that rotates together with the ball screw nut; a housing that rotatably supports the hollow shaft via a rolling bearing; and an elastic member that is provided at least one of a position between the ball screw nut and the hollow shaft and a position between the rolling bearing and the housing.

The elastic member may lie a spring, for example, a disc spring. Alternatively, the elastic member may be an elastic body made of synthetic resin or rubber.

Because the elastic member is provided between the ball screw nut and the hollow shaft. The ball screw nut is allowed to move with respect to the hollow shaft by elastically deforming the elastic member. Thus, when the screw shaft is stopped, the ball screw nut is allowed to rotate to a certain degree. The elastic member is provided between the rolling bearing that supports the hollow shaft and the housing. Therefore, the ball screw nut is allowed to move with respect to the housing by moving the hollow shaft and the rolling bearing against an elastic force of the elastic member. Thus, when the screw shaft is stopped, the ball screw nut is allowed to rotate to a certain degree.

The ball screw unit according to the aspect of the invention described above may be used as an actuator. In this case, the hollow shaft and the ball screw nut are rotated by a motor, whereby the screw shaft linearly moves. Alternatively, the ball screw unit may be used as a shock absorber. In this case, the screw shaft is linearly moved by an external force, whereby the hollow shaft and the ball screw nut are rotated and an electromagnetic force generated by the motor is used as a damping force.

In either case, the screw shaft reciprocates linearly. Usually, a stopper is provided to prevent the screw shaft from moving by an amount that exceeds a predetermined amount in a predetermined direction in the axial direction (predetermined direction is referred to as "forward direction" in this specification. The term "forward direction" signifies the direction in which the screw shaft moves to cause the stopper to hit a predetermined portion. The "forward direction" may be any direction, for example, upward direction, downward direction, forward direction, rearward direction, rightward direction or the leftward direction). The stopper may be, for example, a flange portion formed on the screw shaft, which contacts the housing when the screw shaft moves by a predetermined amount. Alternatively, the stopper may be formed on a member that linearly moves along with the screw shaft, or may be provided on a member that does not move linearly (housing or hollow shaft). The stopper defines the movement limit position of the screw shaft in the forward direction. Therefore, when the screw shaft reaches the movement limit position, the screw shaft is forcibly stopped. If the screw shaft is moving at a high speed, a large rotational inertia force is applied to the nut. As a result, an indentation may be formed in a ball screw path.

In the ball screw unit according to the aspect of the invention described above, because the elastic member is provided between the ball screw nut and the hollow shaft, the ball screw nut is allowed to rotate to a certain degree when the screw shaft is stopped. Therefore, when the forward motion of the screw shaft is stopped and a rotational inertia force is applied to the ball screw nut, the ball screw nut elastically deforms the elastic member using the rotational inertia force. Accordingly, the ball screw nut is allowed to rotate with respect to the screw shaft. As a result, it is possible to prevent application of a large force, which may cause an indentation in the ball screw path portion. Similarly, because the elastic member is provided between the rolling bearing and the housing, the ball screw nut is allowed to rotate to a certain degree when the screw shaft is stopped. Therefore, when the forward motion of the screw shaft is stopped and a rotational inertia force is applied to the ball screw nut, the ball screw nut elastically deforms the elastic member via the rolling bearing using the rotational inertia force. Accordingly, the ball screw nut is allowed to rotate with respect to the screw shaft. As a result, it is possible to prevent application of a large force that may cause an indentation in the ball screw path portion.

In the ball screw unit, linear motion of the screw shaft may be guided by the spline groove formed in the screw shaft and the spline outer cylinder that is splined to the spline groove. In this case, the spline may be ball spline or engagement-type spline, for example, involute spline.

With the ball screw unit according to the aspect of the invention described above, an impact load that is applied when the screw shaft is forcibly stopped is reduced, whereby formation of an indentation in the ball screw path portion is prevented. Thus, it is possible to solve the problem that an inertia moment increases when a larger-sized ball screw unit is employed to ensure sufficient strength of the ball screw. As a result, it is possible to produce a more compact and lighter ball screw unit.

BRIEF DESCRIPTION OF THE DRAWINGS

The foregoing and further objects, features and advantages of the invention will become apparent from the following description of an example embodiment with reference to the accompanying drawings, wherein the same or corresponding portions are denoted by the same reference numerals and wherein:

FIG. 1 is a cross-sectional view showing a ball screw unit according to an embodiment of the invention.

DETAILED DESCRIPTION OF THE EMBODIMENT

Hereafter, an embodiment of the invention will be described. The "right-and-left direction" in the description below is a direction indicated by an arrow in the drawing. In addition, the leftward direction is the forward direction. Note that, these expressions concerning the directions are employed just for ease of explanation, and the orientation of a ball screw unit according to the embodiment of the invention when it is actually used is not particularly limited.

FIG. 1 shows a ball screw unit according to an embodiment of the invention.

A ball screw in includes: a steel screw shaft 2 that extends in the right-and-left direction and that has a screw groove 2a and a spline groove 2b which extends in the right-and-left direction; a ball screw nut 3 that is screwed to the screw groove 2a of the screw shaft 2 via balls; a hollow shaft 4 that rotates together with the ball screw nut 3 and that extends in the leftward direction; a ball spline outer cylinder 5 that is splined to the spline groove 2b of the screw shaft 2 via balls and that guides linear motion of the screw shaft 2 in the right-and-left direction (axial direction of the screw shaft 2); a housing 6 that rotatably holds the hollow shaft 4 via rolling bearings 7 and 8 and that holds the ball spline outer cylinder 5 in such a manner that the ball spline cylinder 5 is immovable; and a ball screw protection unit 10 that protects a ball screw.

The screw shaft 2 and the hollow shaft 4 are coaxially arranged. In the ball screw unit 1, the hollow shaft 4 serves also as a rotor of a motor, and the hollow shaft 4 and the ball screw nut 3 are rotated to produce linear motion of the screw shaft 2. The ball screw unit 1 is used in this manner.

As the rolling bearings 7 and 8, a pair of angular contact rolling bearings 7 that hold a right end portion of the hollow shaft 4 and a deep groove rolling bearing 8 that holds a middle portion of the hollow shaft 4 are used, respectively.

In an existing ball screw unit, the hollow shaft 4 is fixed to the ball screw nut 3 and is held by the housing 6 in such a manner that the hollow shaft 4 is not allowed to move in the axial direction with respect to the housing 6. In contrast, in the ball screw unit 1 according to the embodiment of the invention, the hollow shaft 4 is connected to the ball screw nut 3 with a biasing force of an elastic member and is allowed to move leftward with respect to the housing 6.

The ball screw unit 1 is suitable for, for example, an electromagnetic suspension for a vehicle. The electromagnetic suspension is a shock absorber that converts axial motion transmitted from a tire into rotational motion with the use of a ball screw mechanism, introduces this rotational motion into a motor, and uses an electromagnetic force generated by the motor as a damping force. When overstroke of the suspension occurs, for example, because a vehicle runs on to a bump, the screw shaft 2 moves leftward (in the forward direction) at a high speed and a bump stopper that is provided at a linear motion portion hits, for example, a motor flange. In this case, the motor, which has been rotating at a high speed, suddenly stops and an excessive axial force may be applied to path portions of the ball screw formed of the screw shaft 2 and the ball screw nut 3 due to an inertia torque of the motor. How to protect the ball screw mechanism in this case is an issue to be resolved.

The ball screw protection unit 10 allows the screw shaft 2 to rotate to a certain degree to absorb a high load, thereby protecting the ball screw. The ball screw protection unit 10 includes a disc spring 11 that is provided between the ball screw nut 3 and the hollow shaft 4 and that serves as an elastic member, and a disc spring 12 that is provided between the pair of angular contact rolling bearings 7 and the housing 6 and that also serves as an elastic member.

The disc spring 11 provided between the ball screw nut 3 and the hollow shaft 4 is held by a flange portion 3a formed on the ball screw nut 3 and a right end face of the hollow shaft 4. The disc spring 12 provided between the angular contact rolling bearings 7 and the housing 6 is fitted in an annular recess 6a formed in the housing 6. Outer rings 7a of the pair of angular contact rolling bearings 7 are clamped from the left side by the disc spring 12 fitted in the annular recess 6a and from the right side by a snap ring 13 that is fixed to the housing at a position on the right side of the disc spring 12. Inner rings 7b of the pair of angular contact rolling bearings 7 are clamped by a pressure ring 14 that is fixed to the ball screw nut 3 and a step portion 4a formed in the hollow shaft 4.

In the ball screw unit 1, the disc spring 11, which serves as an elastic member, is provided between the ball screw nut 3 and the hollow shaft 4. Therefore, when the leftward motion (forward motion) of the screw shaft 2 is stopped and a rotational inertia force is applied to the ball screw nut 3, the ball screw nut 3 elastically deforms the disc spring 11 leftward using the rotational inertia force. Accordingly, the ball screw nut 3 is allowed to rotate with respect to the screw shaft 2. As a result, it is possible to prevent application of a large force, which may cause an indentation in the ball screw path portion. If the rotational inertia force that is applied to the ball screw nut 3 is so large that it cannot be absorbed by on the elastic deformation of the disc spring 11. The ball screw nut 3, the hollow shaft 4, and the bearings 7 and 8 move together in such a direction that the disc spring 12 is pushed. The disc spring 12, which serves as an elastic member, is provided between the rolling bearings 7 and the housing 6. Therefore, the hollow shaft 4 is allowed to move leftward along with the rolling bearings 7. When the leftward motion (forward motion) of the screw shaft 2 is stopped and a rotational inertia force is applied to the ball screw nut 3, the ball screw nut 3 elastically deforms the disc spring 12 leftward via the rolling bearing 7 using the rotational inertia force. Accordingly, the ball screw nut 3 is allowed to rotate with respect to the screw shaft 2. As a result, it is possible to prevent application of a large force that may cause an indentation in the ball screw path portion.

Two disc springs 11 and 12 are provided, that is, the disc spring 11, which serves as an elastic member, is provided between the ball screw nut 3 and the hollow shaft 4, and the disc spring 12, which serves as an elastic member, is provided between the angular contact rolling bearings 7 and the housing 6. Alternatively, only one of the disc spring 11 and the disc spring 12 may be provided. Springs other than the disc springs 11 and 12 may be used as elastic members. Instead of springs, annular elastic bodies made of synthetic resin or rubber may be used as elastic members.

The ball screw unit 1 may be used as an electric actuator. In this case, a rotational driving force produced by the motor is converted into an axial thrust of the screw shaft 2 via the ball screw nut 3, an axial reaction force against the thrust is received by the bearings 7 and 8 to produce an axial motion of the screw shaft 2, an axial load that acts on the screw shaft 2 is borne by the ball screw nut 3, and torque is received the ball spline outer cylinder 5.

What is claimed is:

1. A ball screw unit, comprising:
   a screw shaft that includes a screw groove;
   a ball screw nut that is screwed to the screw shaft via balls and that rotates to move the screw shaft linearly in an axial direction of the screw shaft;
   a hollow shaft that rotates together with the ball screw nut;
   a housing that rotatably supports the hollow shaft via a rolling bearing; and
   an elastic member that is provided at a position between the rolling bearing and the housing, such that the elastic member is sandwiched between the rolling bearing and the housing so as to allow the rolling bearing to move in an axial direction of the rolling bearing in relation to the housing,
   wherein a portion of a side face of the elastic member having a diameter less than an outer diameter of the rolling bearing abuts the rolling bearing and a portion of an opposite side face of the elastic member having a diameter less than the outer diameter of the rolling bearing abuts the housing.

2. The ball screw unit according to claim 1, wherein the elastic member comprises a disc spring.

3. The ball screw unit according to claim 1, wherein the elastic member comprises an elastic body comprising synthetic resin or rubber.

4. The ball screw unit according to claim 1, wherein the elastic member is disposed so as to be compressible in the axial direction of the screw shaft by the rotational inertia force applied to the ball screw nut.

5. The ball screw unit according to claim 1, wherein a snap ring is disposed on a side of the rolling bearing opposite the elastic member.

6. The ball screw unit according to claim 1, wherein the elastic member is configured so as to compress, in the axial direction, under an axial load such that the rolling bearing, the ball screw nut and the hollow shaft are allowed to move in the axial direction in relation to the housing.

7. The ball screw unit according to claim 1, wherein the housing includes a wall on a side of the elastic member opposite the rolling bearing formed such that a distance from an innermost portion of the wall and a center axis of the rolling bearing is less than an outer radius of the rolling bearing, and
   wherein the elastic member is disposed at the position between the rolling bearing and the housing such that the elastic member is sandwiched between the wall and the rolling bearing.

8. The ball screw unit according to claim 7, wherein the elastic member abuts the rolling bearing and a portion of the wall of the recess, the portion, of the wall of the recess having a distance to the center axis of the rolling bearing which is less than the outer radius of the rolling bearing.

9. The ball screw unit according to claim 7, wherein the elastic member is disposed between the rolling bearing and a portion of the wall of the recess having a distance to the center axis of the rolling bearing which is less than the outer radius of the rolling bearing.

10. The ball screw unit according to claim 1, wherein the elastic member is configured so as to compress, in the axial direction, under an axial load such that the rolling bearing is allowed to move in the axial direction in relation to the housing.

11. A ball screw unit, comprising:
    a screw shaft that includes a screw groove;
    a ball screw nut that is screwed to the screw shaft via balls and that rotates to move the screw shaft linearly in an axial direction of the screw shaft;
    a hollow shaft that rotates together with the ball screw nut;
    a housing that rotatably supports the hollow shaft via a rolling bearing; and
    an elastic member that is provided at a position between the rolling bearing and the housing, such that the elastic member is sandwiched between the rolling bearing and the housing so as to allow the rolling bearing to move in an axial direction of the rolling bearing in relation to the housing,
    wherein the housing includes a recess which extends radially inward of a radially outermost portion of the rolling bearing and a wall of the recess opposite the rolling bearing formed such that an inner diameter of the flange wall of the recess is less than an outer diameter of the rolling bearing, and
    wherein the elastic member is disposed at the position between the rolling bearing and the housing such that the elastic member is sandwiched between the flange wall of the recess and the rolling bearing.

12. The ball screw unit according to claim 11, wherein the elastic member is sandwiched between the rolling bearing and a portion of the wall of the recess having a diameter less than the outer diameter of the rolling bearing.

13. The ball screw unit according to claim 11, wherein an inner diameter of the housing adjacent the recess and opposite the rolling bearing is less than an inner diameter of the housing adjacent on a side of the recess on, which the rolling bearing is disposed.

14. A ball screw unit, comprising:
    a screw shaft that includes a screw groove;
    a ball screw nut that is screwed to the screw shaft via balls and that rotates to move the screw shaft linearly in an axial direction of the screw shaft;
    a hollow shaft that rotates together with the ball screw nut;
    a housing that rotatably supports the hollow shaft via a rolling bearing; and
    an elastic member that is provided at a position between the rolling bearing and the housing,
    wherein an other elastic member is provided between the ball screw nut and the hollow shaft, and held by a flange portion formed on the ball screw nut and an end face of the hollow shaft.

\* \* \* \* \*